United States Patent [19]
Sakamoto

[11] Patent Number: 5,969,763
[45] Date of Patent: Oct. 19, 1999

[54] DECODING SYSTEM FOR MOTION PICTURE DATA

[75] Inventor: Hideo Sakamoto, Tokyo, Japan

[73] Assignee: NEC Corporation, Tokyo, Japan

[21] Appl. No.: 08/740,484

[22] Filed: Oct. 30, 1996

[30] Foreign Application Priority Data

Oct. 30, 1995 [JP] Japan .................................. 7-281734

[51] Int. Cl.⁶ .................................................. H04N 7/12
[52] U.S. Cl. ........................................ 348/390; 348/384
[58] Field of Search ............................. 348/7, 6, 12, 13, 348/390, 845.02, 8, 10, 384, 387; 455/42, 5.1, 4.1; H04N 7/173, 7/14

[56] References Cited

U.S. PATENT DOCUMENTS

| | | | |
|---|---|---|---|
| 5,414,455 | 5/1995 | Hooper et al. | 348/7 |
| 5,521,630 | 5/1996 | Chen et al. | 348/7 |
| 5,550,577 | 8/1996 | Verbiest et al. | 348/7 |
| 5,606,359 | 2/1997 | Youden et al. | 348/7 |

FOREIGN PATENT DOCUMENTS 6-319111  11/1994  Japan .
7-284042  10/1995  Japan .

*Primary Examiner*—Tommy P. Chin
*Assistant Examiner*—Luanne P. Dion
*Attorney, Agent, or Firm*—Foley & Lardner

[57] ABSTRACT

A motion picture data decoding system extracts motion picture data from transmitted MPEG data and decodes the extracted motion picture data. A multi-media communication terminal includes a data buffer portion storing the extracted motion picture data per predetermined data unit, the data buffer portion having a capacity of storing a plurality sets of the data unit, motion picture data being accumulated in the data buffer per data unit, and motion picture data being taken from the data buffer portion per data unit and decoded by said decoding portion. In concrete, when the amount of the motion picture data transmitted per data unit and sequentially accumulated in the data buffer exceeds the threshold value and amount of the motion picture data accumulated in the data buffer and being sequentially decoded per data unit, is reduced across the threshold value, to issue a demand for transmission of next data unit for monitoring the data buffer portions and making the decoding process efficient. By this, even when transmission efficiency is fluctuated due to load or go forth on a CPU, the motion picture can be smoothly reproduced and displayed.

7 Claims, 3 Drawing Sheets

DECODING SYSTEM FOR MOTION PICTURE DATA

BACKGROUND OF THE INVENTION

1. Field of the Invention

The present invention relates to a data decoding system for a motion picture. More specifically, the invention relates to a motion picture decoding system in a multi-media data communication performing reproduction of motion picture utilizing MPEG (Motion) Picture Expert Group) data compressed into lesser amount of code than an original motion picture.

2. Description of the Related Art

An MPEG system which compresses a motion picture data requiring a large data amount, into lesser data amount by encoding, is a quite important technology in multi-media communication.

In a VOD (video on demand) system or so forth employing ATM (asynchronous transfer mode) communication, MPEG data is transmitted from a server (MPEG data transfer unit) to a CPU unit (multi-media communication terminal) utilizing communication protocol, such as TCP/IP (Transmission Control Protocol/Internet Protocol). The MPEG data to be transmitted is divided into groups of pictures (GOP). Inside of the GOP is further divided into a region called a header portion containing information other than video and audio data, such as time, ID number and so forth, and a region containing video and audio information. Therefore, reproduction of picture is performed by removing the header portion through process in the multi-media terminal for extracting only video and audio data and decoding the extracted video and audio data.

However, in the VOD system employing the ATM communication, while transmission of the MPEG data is performed with a communication protocol, such as TCP/IP, since CPU is used for transmission process, fluctuation of transmission speed can be caused depending upon process load on the multi-media terminal and/or server, such as application programs running thereon.

Namely, due to load of application, it is possible to cause delay in data transmission demand from the multi-media terminal or delay in data transmission timing from the server. Once such fluctuation of the transmission speed is caused, the reproduced picture on the multi-media communication terminal cannot be smooth, or delay in switching of the reproduction mode can be caused.

SUMMARY OF THE INVENTION

Therefore, it is an object of the present invention to provide a motion picture decoding system which can smoothly reproduce motion picture at a multi-media communication terminal, even when fluctuation of transmission efficiency of a MPEG data is caused due to load on CPU by execution of application program or so forth.

A motion picture data decoding system, according to the present invention is constructed to accumulate MPEG data for a plurality of data units for monitoring accumulating condition per data unit so that MPEG data can be accumulated in a data buffer efficiently.

According to the first invention, a decoding system for a motion picture data for extracting motion picture data from transferred MPEG data and sequentially decoding the extracted motion picture data, comprises a data buffer portion storing the extracted motion picture data per predetermined data unit, said data buffer portion having a capacity of storing a plurality sets of said data unit, and a decoding portion, motion picture data being accumulated in said data buffer per data unit, and motion picture data being taken from said data buffer portion per data unit and decoded by said decoding portion.

According to the second invention, a data amount smaller than a data amount of predetermined data unit is set as a threshold value. When amount the motion picture data transmitted per data unit and sequentially accumulated in said data buffer exceeds said threshold valve and amount of the motion picture data accumulated in said data buffer and being sequentially decoded per data unit, is reduced across said threshold value, a demand for transmission of next data unit for monitoring the data buffer portion is issued.

As set forth, the motion picture data decoding system according to the invention can accommodate fluctuation of transmission efficiency of the MPEG data due to load fluctuation in the system or so forth by data accumulated in the data buffer to make it possible to constantly reproduce smooth motion picture.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment, with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail so as not to unnecessarily obscure the present invention.

Figure 1:
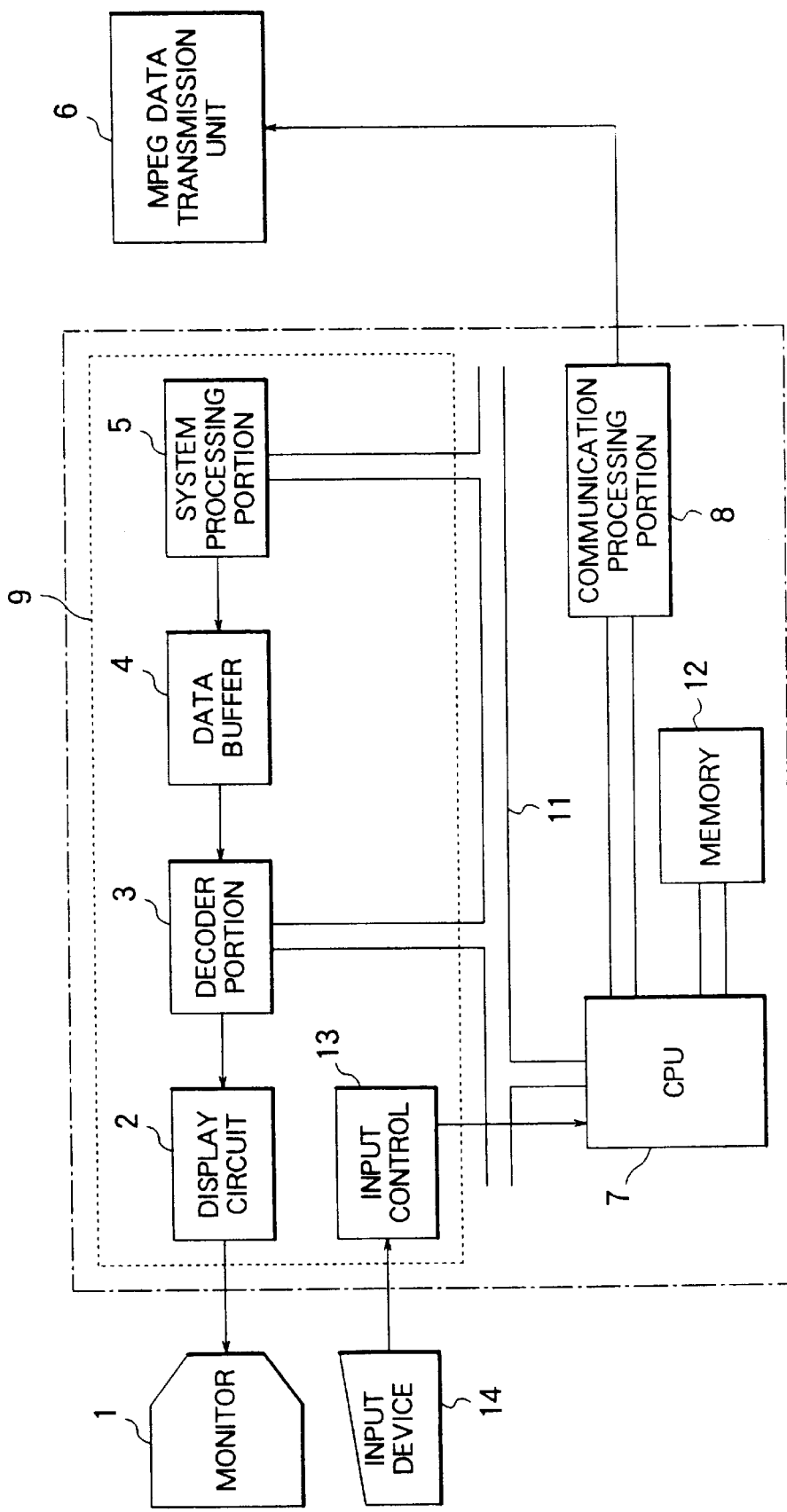
FIG. 1 is a schematic block diagram showing overall system of preferred embodiment of multi-media communication terminal according to the present invention.

FIG. 1 is a schematic block diagram showing a multi-media communication terminal employing an asynchronous transfer mode (ATM) communication. In FIG. 1, a multi-media communication terminal 10 includes a communication processing portion 8 receiving a motion picture expert group (MPEG) data from a MPEG data transmission system (server), a MPEG control portion 9 decoding the received MPEG data and reproducingly display a motion picture on a monitor 1, a CPU 7 controlling the communication processing portion 8 and the MPEG control portion 9, a memory 12 and a CPU bus 11.

The MPEG control portion 9 has a system processing portion 5, a data buffer portion 4, a decoder portion 3, a display circuit 2 and an input control portion 13. The MPEG data transmitted from the MPEG data transmission system 6 contains a region containing information of ID of the MPEG data or so forth, referred to as private data, and a region containing motion picture data. The system processing portion 5 separates the region of the private data and the region of the motion picture to accumulate the motion picture data in the data buffer portion 4.

The decoder portion 3 sequentially decodes the motion picture data accumulated in the data buffer portion 4 and outputs to the display circuit 2. The display circuit 2 drives the monitor 1 for displaying the motion picture data. The input control portion 13 receives a command signal for reproduction of motion picture or so forth, input from an input device 14 and transfers the received command signal to the CPU 7.

In the shown embodiment of the decoding system for the motion picture data, constructed as set forth above, the MPEG data is transferred from the MPEG data transmission system 6 to the communication processing portion 8 and then is temporarily stored in the memory 12 when an application program for reproduction of the motion picture, operative on the multi-media communication terminal 10, activates a device driver, the CPU 7 transfers the MPEG data stored in the memory 12 to the system processing portion 5 via a host CPU bus 11. Then, the MPEG data is divided into the private data and the motion picture data in the system processing portion 5.

The motion picture data is then accumulated in the data buffer portion 4. This data is then fed to the decoder portion 3 and is reproduced as data which can be displayed, in the decoder portion 3. After decoding, data is fed to the display circuit 2. Then, the data is reproduced as a visible image on the display monitor 1 by the display circuit 3.

Figure 2:
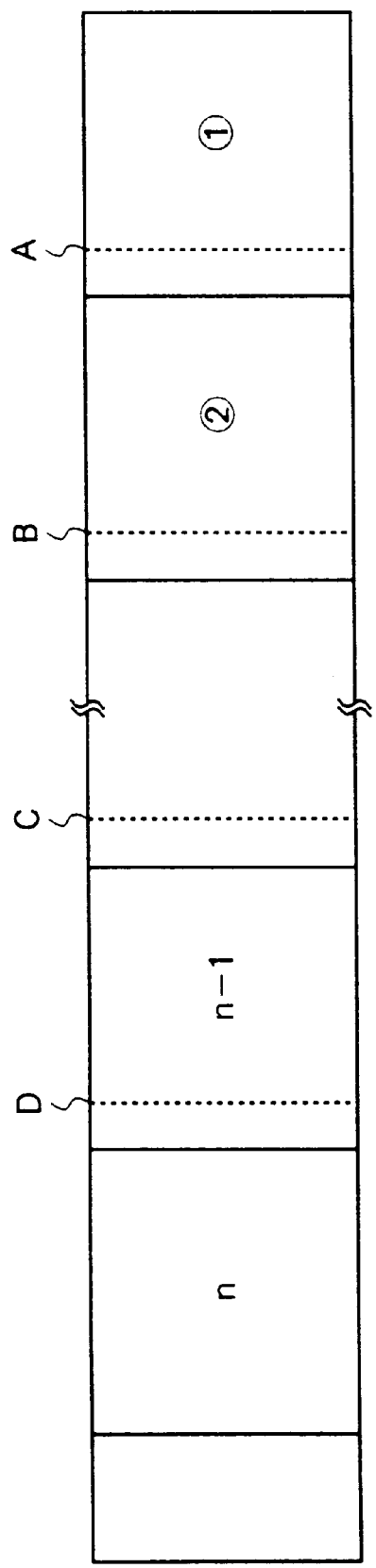
FIG. 2 is an illustration showing a concept of a data accumulation system in a data buffer portion in the preferred embodiment of the multi-media communication terminal according to the invention.

FIG. 2 is an illustration showing a concept of data accumulation system by the data buffer portion 4. The data buffer portion 4 is formed with a first-in first-out (FIFO) memory having a predetermined capacity. The foregoing MPEG data is performed per MPEG data unit set on the application program. Assuming that the data unit is set at 64 KB, the FIFO memory may accumulate ① to n of n in number of 64 KB of MPEG data.

In the present invention, threshold values A to D are set at a value slightly lower than an upper limit of the transfer data unit (slightly smaller data amount than the data unit). Now, if the MPEG data is accumulated in the data buffer portion 4 beyond the threshold value A, interruption is caused. Once interruption is caused, the device driver issues a call back process to the application program to perform data demand at the MPEG data unit (64 KB).

On the other hand, conversely, if the MPEG data is sequentially read out from the data buffer 4 and decoded by the decoder portion 3, the MPEG data accumulated in the data buffer portion 4 is gradually reduced. When the amount of accumulated data in the data buffer becomes smaller than the threshold value, interruption is similarly caused to perform data demand.

It should be noted that the threshold value is not necessary to be set in the final data of n, since further MPEG data cannot be accumulated.

Next, discussion will be given for a manner of accumulation of the MPEG data in the data buffer portion 4 by the application program and the device driver, with reference to FIG. 3.

Figure 3:
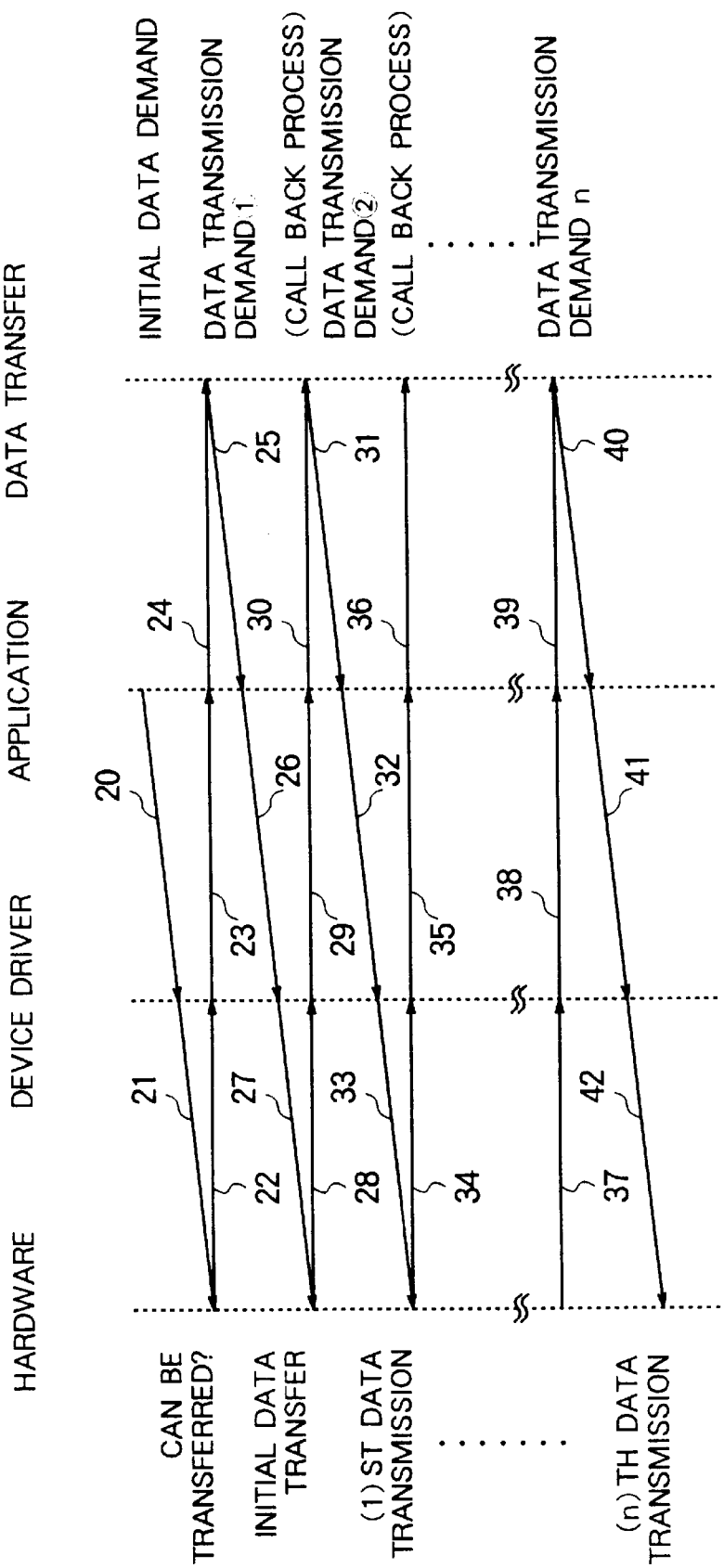
FIG. 3 is a chart showing a MPEG data processing sequence in the preferred embodiment of the multi-media communication terminal according to the invention.

At first, when a user of the multi-media communication terminal 10 inputs a command for demand of service (picture reproduction) through the input device 14, the application program active on the demanded service makes the device driver controlling the MPEG control portion 9 to check whether the MPEG data is present in the data buffer (arrows 20 and 21 in FIG. 3).

If data is not present in the data buffer, and a response is returned indicative that transfer can be done, (arrows 22 and 23 in FIG. 3), the application program issues a demand of a data of data transfer unit (e.g. 64 KB) to the MPEG data transmission system 6 (arrow 24 in FIG. 3). When the data is transferred, it is transferred to the device driver via the memory 12 (arrows 25 and 26 in FIG. 3).

Then, in response to the transfer command from the device driver, the data of the MPEG data transfer unit is written in the data buffer portion 4 (arrow 27 in FIG. 3).

Once the MPEG data is written in the data buffer portion 4, the decoder portion 3 instantly initiates decoding of the MPEG data. While data is written in the data buffer portion 4, if the written data amount exceeds the threshold value A in FIG. 2, interruption is caused by the MPEG control portion 9 (arrow 28 in FIG. 3). In response to this, the device driver transfers the call back process to the application program (arrow 29 in FIG. 3).

Then, the application program issues a data demand to the MPEG data transmission system 6 (arrow 30 in FIG. 3). Then, data transmission is performed (arrow 31 in FIG. 3). The data thus transmitted is transferred to the device driver (arrow 32 in FIG. 3) and then written in the data buffer portion 4.

In a manner set forth above, data is sequentially transmitted up to the (n)th data. The foregoing process is repeated until the sequence is stopped by modification of the transfer mode or so forth. Thus, MPEG data in the amount close to the maximum capacity of the data buffer portion 4 can be constantly accumulated. Therefore, even when the MPEG data transmission speed is fluctuated due to the load on the system or so forth, such fluctuation may be accommodated by the data accumulated in the data buffer portion 4.

Namely, the decoder portion 3 sequentially decodes the data accumulated in the data buffer. Therefore, delay in transmission of the MPEG data from the MPEG data transmission system due to load of the application program or so forth, may not affect for decoding process. Thus, the MPEG data can be decoded efficiently.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A decoding system for a motion picture data for extracting motion picture data from transferred motion picture data and sequentially decoding the extracted motion picture data, comprising:

a data buffer portion storing the extracted motion picture data per predetermined data unit, said data buffer portion having a capacity of storing a plurality sets of said data unit, and a decoding portion, motion picture data being accumulated in said data buffer per data unit, and motion picture data being taken from said data buffer portion per data unit and sequentially decoded by said decoding portion, wherein first through n-th threshold values are set in said data buffer, the first threshold value being set at a data amount smaller than said predetermined data unit, n being an integer greater than one, and the second through n-th threshold values being set in the data buffer at respective data amounts slightly lower than i* said predetermined data unit, i being an integer from 2 to n, respectively, the n-th threshold value being set at a value slightly greater than one predetermined data unit less than a maximum data capacity of said data buffer, wherein, when the motion picture data being sequentially accumulated in or removed from said data buffer per data unit exceeds or drops below, respectively, any of said first through n-th threshold values, transfer of the motion picture data for a next data unit is demanded.

2. A multi-media communication terminal comprising:

a communication processing portion receiving a motion picture data;

a monitor for displaying a motion picture;

a motion picture motion picture control portion decoding a motion picture data from a received data, said motion picture control portion including:

a system processing portion extracting a motion picture data from said motion picture data;

a data buffer portion storing the extracted motion picture data per predetermined data unit, said data buffer portion having a capacity of storing a plurality sets of said data unit;

a decoder portion for sequentially decoding the motion picture data taken from said data buffer per data unit; and a display circuit for reproductively displaying the motion picture on said monitor on the basis of the decoded data; and a CPU controlling said communication processing portion and said motion picture control portion, wherein said data buffer portion has set therein first through n-th threshold values, the first threshold value being representative of a smaller data amount than that of said predetermined data unit, n being an integer greater than one, and the second through n-th threshold values being set in the data buffer at respective values slightly lower than i* said predetermined data unit, i being an integer from 2 to n, respectively, the n-th threshold value being set at a value greater than one predetermined data unit less than a maximum data capacitor of said data buffer, wherein said motion picture control portion is responsive to an amount of the motion picture data transmitted per data unit and sequentially accumulated in or removed from said data buffer, exceeding or dropping below, respectively, any of said first through n-th threshold values, to issue a demand for transmission of a next data unit to said communication processing portion.

3. A multi-media communication terminal as set forth in claim 2, wherein said system processing portion includes a first region containing a private data and a second region containing a motion picture data from the MPEG data, and accumulates the motion picture data in said data buffer.

4. A motion picture data decoding system as set forth in claim 1, wherein n is greater than or equal to three, wherein said second threshold value is greater than said predetermined data unit but less than two times said predetermined data unit, and wherein said third threshold value is greater than two times said predetermined data unit but less than three times said predetermined data unit.

5. A motion picture data decoding system as set forth in claim 1, wherein said data buffer portion is capable of storing a maximum of n predetermined data units.

6. A multi-media communication terminal as set forth in claim 2, wherein n is greater than or equal to three, wherein said second threshold value is greater than said predetermined data unit but less than two times said predetermined data unit, and wherein said third threshold value is greater than two times said predetermined data unit but less than three times said predetermined data unit.

7. A multi-media communication terminal as set forth in claim 2, wherein said data buffer portion is capable of storing a maximum of n predetermined data units.

* * * * *